United States Patent
Oota

(10) Patent No.: US 8,792,009 B2
(45) Date of Patent: Jul. 29, 2014

(54) IMAGE PICKUP APPARATUS THAT PERFORMS IMAGE PICKUP USING ROLLING SHUTTER METHOD, METHOD OF CONTROLLING THE SAME, AND STORAGE MEDIUM

(75) Inventor: Makoto Oota, Inagi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/464,368

(22) Filed: May 4, 2012

(65) Prior Publication Data

US 2012/0287295 A1  Nov. 15, 2012

(30) Foreign Application Priority Data

May 11, 2011  (JP) ................................. 2011-106213

(51) Int. Cl.
 *H04N 5/228* (2006.01)
 *H04N 5/217* (2011.01)
 *H04N 3/14* (2006.01)
 *H04N 5/335* (2011.01)
 *G06K 9/40* (2006.01)
 *G03B 17/00* (2006.01)

(52) U.S. Cl.
 USPC ............... 348/208.1; 348/208.99; 348/208.2; 348/208.3; 348/241; 348/296; 382/254; 382/255; 382/275; 396/52; 396/54

(58) Field of Classification Search
 CPC ............ H04N 5/23248; H04N 5/2329; H04N 5/23267; H04N 5/23254; H04N 5/2327; H04N 5/3532; H04N 3/155; H04N 5/23293
 USPC ............. 348/208.1–208.99, 294–324, 222.1, 348/229.1–231.9, 239–251; 382/254–275, 382/296–301; 396/52–55
 See application file for complete search history.

(56) References Cited

U.S. PATENT DOCUMENTS

| | | | | |
|---|---|---|---|---|
| 7,978,226 | B2* | 7/2011 | Nobuoka | 348/221.1 |
| 8,009,337 | B2* | 8/2011 | Kubo et al. | 358/505 |
| 8,462,219 | B2* | 6/2013 | Matsuyama | 348/208.4 |
| 2004/0046873 | A1* | 3/2004 | Kubo et al. | 348/222.1 |
| 2008/0079814 | A1* | 4/2008 | Nobuoka | 348/208.99 |
| 2008/0144964 | A1* | 6/2008 | Soinio et al. | 382/275 |
| 2009/0231445 | A1* | 9/2009 | Kanehiro | 348/208.2 |
| 2010/0002109 | A1* | 1/2010 | Kajimura | 348/294 |
| 2010/0147948 | A1* | 6/2010 | Powell et al. | 235/455 |
| 2011/0085049 | A1* | 4/2011 | Dolgin et al. | 348/208.4 |
| 2011/0211082 | A1* | 9/2011 | Forssen et al. | 348/208.2 |
| 2011/0228114 | A1* | 9/2011 | Tominaga | 348/208.6 |

(Continued)

FOREIGN PATENT DOCUMENTS

JP  2006-186885 A  7/2006

*Primary Examiner* — Chia-Wei A Chen

(74) *Attorney, Agent, or Firm* — Carter, DeLuca, Farrell & Schmidt, LLP

(57) ABSTRACT

An image pickup apparatus capable of reducing camera-shake blur and rolling-caused distortion of image data obtained by shooting without including invalid data. An object obtained by shooting is stored in a memory area as first image data, and data having a smaller data size than the first image data is acquired as second image data by clipping from the memory area. A clipping position which enables correction of camera-shake blur is calculated according to an amount of movement due to a camera shake. Range information indicative of a range in the memory area and shift amounts used for correcting rolling-caused distortion are calculated. Rolling-caused distortion of the second image data is corrected based on the calculated shift amounts.

8 Claims, 13 Drawing Sheets

(56) References Cited

U.S. PATENT DOCUMENTS

2011/0242378 A1* 10/2011 Mabuchi .................. 348/296
2011/0242385 A1* 10/2011 Nishihara ................ 348/308
2011/0267514 A1* 11/2011 D'Angelo et al. ........... 348/296
2011/0284637 A1* 11/2011 Powell et al. ............. 235/455
2012/0092559 A1* 4/2012 Ubillos .................. 348/607
2012/0147224 A1* 6/2012 Takayama ................ 348/241
2013/0044230 A1* 2/2013 Zhou .................... 348/208.6
2013/0044241 A1* 2/2013 Zhou .................... 348/241
2013/0063622 A1* 3/2013 Schoeberl et al. ........ 348/222.1

* cited by examiner

1

IMAGE PICKUP APPARATUS THAT PERFORMS IMAGE PICKUP USING ROLLING SHUTTER METHOD, METHOD OF CONTROLLING THE SAME, AND STORAGE MEDIUM

BACKGROUND OF THE INVENTION

1. Field of the Invention

The present invention relates to an image pickup apparatus, a method of controlling the same, and a storage medium, and more particularly to an image pickup apparatus that picks up an object using a rolling shutter method, a method of controlling the same, and a storage medium.

2. Description of the Related Art

Conventionally, as an exposure system used in an image pickup operation, there have been known a global shutter method and a rolling shutter method. In an image pickup apparatus using the global shutter method, which is represented by an image pickup apparatus including a CCD sensor, the exposure time period and the exposure start time are substantially the same between pixels of one frame image.

On the other hand, in an image pickup apparatus using the rolling shutter method, represented by an image pickup apparatus including a CMOS sensor, although the exposure time period is the same between pixels in one frame image, the exposure start time is different for each scan line.

Therefore, in the image pickup apparatus using the CMOS sensor, an image distortion caused by the rolling shutter (hereinafter referred to as the "rolling-caused distortion") occurs.

Further, electronic image stabilization has been proposed as processing for reducing camera-shake blur in an image picked up by the image pickup apparatus by adjusting a clipping position of image data temporality stored in a memory.

The electronic image stabilization is processing for reducing camera-shake blur in an image picked up by the image pickup apparatus by calculating an amount of movement of the image pickup apparatus e.g. from a motion vector detected using a gyroscope and adjusting a clipping position of image data from the memory according to the calculated movement amount.

In such a technical background, there has been disclosed a technique that collectively performs correction of camera-shake blur and correction of image distortion due to a rolling shutter in an image picked up by an image pickup apparatus (see e.g. Japanese Patent Laid-Open Publication No. 2006-186885).

However, in the image pickup apparatus disclosed in Japanese Patent Laid-Open Publication No. 2006-186885, there is no description of processing to be performed when an area to be referred to for correcting rolling-caused distortion occurring in the image picked up by the image pickup operation using the rolling shutter method is outside the range of an area on a memory from which image data is to be clipped. In the cause of such processing, the area to be referred to is sometimes outside an area in which image data has been stored. In an area outside the range of the area where image data has been stored, data irrelevant to images, i.e. invalid data as image data (so-called junk data) exists. Therefore, if distortion correction processing is performed without adjusting the area to be referred to, data including invalid data is sometimes output.

SUMMARY OF THE INVENTION

The present invention provides an image pickup apparatus capable of reducing camera-shake blur and rolling-caused distortion of image data obtained by shooting without including invalid data, a method of controlling the image pickup apparatus, and a storage medium.

In a first aspect of the present invention, there is provided a image pickup apparatus that includes a storage area capable of storing first image data indicative of an object obtained by shooting the object by a rolling shutter method, and clips data having a smaller data size than a size of the first image data from the storage area, to thereby acquire the clipped data as second image data, comprising a detection unit configured to detect an amount of movement due to a camera shake, a first calculation unit configured to calculate a clipping position which enables correction of camera-shake blur, within a range of the first image data stored in the memory from which the second image data can be clipped, according to the amount of movement detected by the detection unit, a second calculation unit configured to calculate range information indicative of a range in the storage area for use in correcting rolling-caused distortion caused by shooting by the rolling shutter method, and a displacement amount of the first image data caused by the rolling-caused distortion, an output unit configured to directly output the calculated clipping position when it is possible to clip data in the range indicated by the range information calculated by the second calculation unit from the first image data, starting from the clipping position calculated by the first calculation unit, and to output the clipping position corrected such that data in the range indicated by the range information can be clipped from the first image data when it is impossible to clip the data in the range indicated by the range information calculated by the second calculation unit, starting from the clipping position calculated by the first calculation unit, and a correction unit configured to acquire the data in the range indicated by the range information starting from the clipping position output from the output unit as the second image data, and correct the rolling-caused distortion of the acquired second image data based on the displacement amount calculated by the second calculation unit.

In a second aspect of the present invention, there is provided a method of controlling an image pickup apparatus that includes a storage area capable of storing first image data indicative of an object obtained by shooting the object by a rolling shutter method, and clips data having a smaller data size than a size of the first image data from the storage area, to thereby acquire the clipped data as second image data, comprising detecting an amount of movement due to a camera shake, calculating a clipping position which enables correction of camera-shake blur, within a range of the first image data stored in the memory from which the second image data can be clipped, according to the detected amount of movement, calculating range information indicative of a range in the storage area for use in correcting rolling-caused distortion caused by shooting by the rolling shutter method, and a displacement amount of the first image data caused by the rolling-caused distortion, directly outputting the calculated clipping position when it is possible to clip data in the range indicated by the calculated range information from the first image data, starting from the calculated clipping position, and outputting the clipping position corrected such that data in the range indicated by the range information can be clipped from the first image data when it is impossible to clip the data in the range indicated by the calculated range information, starting from the calculated clipping position, and acquiring the data in the range indicated by the range information starting from the output clipping position as the second image data, and correct the rolling-caused distortion of the acquired second image data based on the calculated displacement amount.

In a third aspect of the present invention, there is provided a non-transitory computer-readable storage medium storing a computer-executable program for causing a computer to execute a method of controlling an image pickup apparatus that includes a storage area capable of storing first image data indicative of an object obtained by shooting the object by a rolling shutter method, and clips data having a smaller data size than a size of the first image data from the storage area, to thereby acquire the clipped data as second image data, wherein the method comprises detecting an amount of movement due to a camera shake, calculating a clipping position which enables correction of camera-shake blur, within a range of the first image data stored in the memory from which the second image data can be clipped, according to the detected amount of movement, calculating range information indicative of a range in the storage area for use in correcting rolling-caused distortion caused by shooting by the rolling shutter method, and a displacement amount of the first image data caused by the rolling-caused distortion, directly outputting the calculated clipping position when it is possible to clip data in the range indicated by the calculated range information from the first image data, starting from the calculated clipping position, and outputting the clipping position corrected such that data in the range indicated by the range information can be clipped from the first image data when it is impossible to clip the data in the range indicated by the calculated range information, starting from the calculated clipping position, and acquiring the data in the range indicated by the range information starting from the output clipping position as the second image data, and correct the rolling-caused distortion of the acquired second image data based on the calculated displacement amount.

According to the present invention, it is possible to provide an image pickup apparatus capable of reducing camera-shake blur and rolling-caused distortion of image data obtained by shooting without including invalid data, a method of controlling the image pickup apparatus, and a storage medium.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
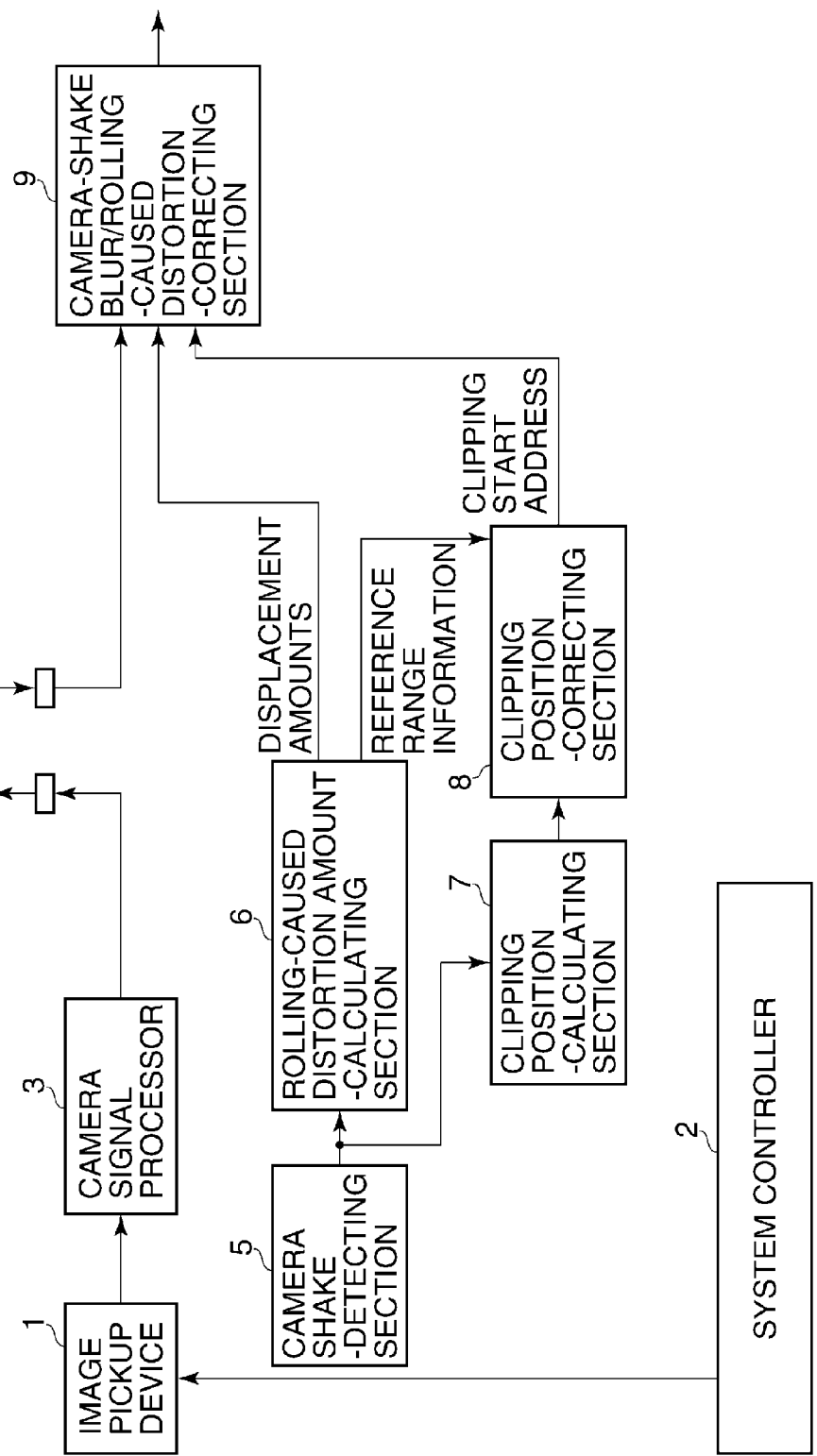
FIG. 1 is a schematic block diagram of an image pickup apparatus according to a first embodiment of the present invention.

FIG. 1 is a schematic block diagram of an image pickup apparatus 100 according to a first embodiment of the present invention.

In FIG. 1, the image pickup apparatus 100 comprises an image pickup device 1, a system controller 2, a camera signal processor 3, a memory 4, a camera shake-detecting section 5, a rolling-caused distortion amount-calculating section 6, a clipping position-calculating section 7, a clipping position-correcting section 8, and a camera-shake blur/rolling-caused distortion-correcting section 9.

The image pickup device 1 on which an object image is formed converts the object image to an electric signal by photoelectric conversion according to a control signal from the system controller 2, and outputs an analog image signal.

The camera signal processor 3 converts the analog image signal output from the image pickup device 1 to a digital signal, and performs signal processing of an image pickup system, such as aperture correction, gamma correction, and white balancing. An output signal from the camera signal processor 3 is temporarily stored in the memory 4 (storage area) which can store data, implemented e.g. by a SDRAM.

The system controller 2 controls driving of the image pickup device 1. The camera shake-detecting section 5 detects a shake of the image pickup apparatus 100, and outputs the detection result to the rolling-caused distortion amount-calculating section 6 and the clipping position-calculating section 7 as a motion amount. The camera shake-detecting section 5 corresponds to a detection unit configured to detect an amount of movement caused by camera shake. The camera shake-detecting section 5 can detect a shake using a gyro sensor, and generates an angular velocity signal corresponding to a shake applied to the image pickup apparatus 100. The camera shake-detecting section 5 calculates an amount of movement of the image pickup apparatus 100 from the angular velocity signal according to a focal length.

The camera shake-detecting section 5 may be equipped with a frame memory and calculate an amount of movement of the image pickup apparatus 100 by detecting a motion vector or like processing.

The rolling-caused distortion amount-calculating section 6 calculates displacement amounts of coordinates of a formed image location due to rolling-caused distortion and reference range information (range information), from the amount of movement output from the camera shake-detecting section 5. More specifically, the rolling-caused distortion amount-calculating section 6 calculates a pixel position in the memory 4 where each pixel is formed, according to the above-mentioned amount of movement, and calculates a difference between a coordinate position where the pixel is to be originally formed (defined in association with a pixel position in the memory 4) and a coordinate position corresponding to the pixel position where the pixel is actually formed, as the displacement amounts. Further, the reference range information is information indicative of a range of an area in the memory 4 dependent on the aforementioned amount of movement, in which image data to be used for correcting rolling-caused distortion is stored. As mentioned above, the rolling-caused distortion amount-calculating section 6 corresponds to a second calculation unit configured to calculate the range information indicative of a range in the memory 4 for use in correcting rolling-caused distortion caused by shooting by the rolling shutter method, and the displacement amounts.

The clipping position-calculating section 7 calculates a clipping position while considering anti-shake (image stabilization) based on the amount of movement output from the camera shake-detecting section 5. More specifically, the clipping position-calculating section 7 adjusts a clipping position in the immediately preceding frame according to the amount of movement to thereby calculate clipping coordinates (clipping position) of an image, and outputs the calculated clipping coordinates. That is, the clipping position-calculating section 7 corresponds to a first calculation unit configured to calculate a clipping position which enables correction of camera-shake blur, within a range of first image data stored in the memory from which second image data can be clipped, according to the amount of movement detected by the camera shake-detecting section 5. The first and second image data will be described with reference to FIG. 3.

The clipping position-correcting section 8 corrects the clipping coordinates output from the clipping position-calculating section 7 according to the reference range information output from the rolling-caused distortion amount-calculating section 6, and outputs the corrected clipping coordinates. More specifically, the clipping position-correcting section 8 corrects the clipping coordinates to within a range in which rolling-caused distortion can be corrected based on the reference range information output from the rolling-caused distortion amount-calculating section 6 and the clipping coordinates output from the clipping position-calculating section 7. Then, the clipping position-correcting section 8 outputs the corrected clipping coordinates as a clipping start address. Although, in the present embodiment, the clipping position is set, as described above, as a position from which the second image data starts to be clipped from the first image data stored in the memory, this is not limitative, but the clipping position may be any suitable position insofar as the range indicated by the reference range information can be defined in the area in the memory with reference to the clipping position, and the clipping position finally enables the rolling-caused distortion correction.

Therefore, when data in a range indicated by the range information calculated by the rolling-caused distortion amount-calculating section 6 can be clipped from the first image data, starting from the clipping position calculated by the clipping position-calculating section 7, the clipping position-correcting section 8 directly outputs the clipping position without correction, whereas if not, the clipping position-correcting section 8 outputs the clipping position corrected such that the data in the above-mentioned range can be clipped from the first image data. Therefore, the clipping position-correcting section 8 corresponds to an output unit.

The camera-shake blur/rolling-caused distortion-correcting section 9 reads image data from the memory 4, using the displacement amounts output from the rolling-caused distortion amount-calculating section 6 and the address designated by the clipping start address output from the clipping position-correcting section 8. Then, the camera-shake blur/rolling-caused distortion-correcting section 9 performs geometric deformation, such as affine transformation, on the read data to thereby output corrected data which has been subjected to correction of camera-shake blur and rolling-caused distortion of the image picked up by the image pickup apparatus 100. Thus, the camera-shake blur/rolling-caused distortion-correcting section 9 acquires data in a range starting from the clipping position output from the clipping position-correcting section 8 as second image data, and corrects rolling-caused distortion of the acquired second image data based on the displacement amounts calculated by the rolling-caused distortion amount-calculating section 6. Therefore, the camera-shake blur/rolling-caused distortion-correcting section 9 corresponds to a correction unit.

Figure 2:
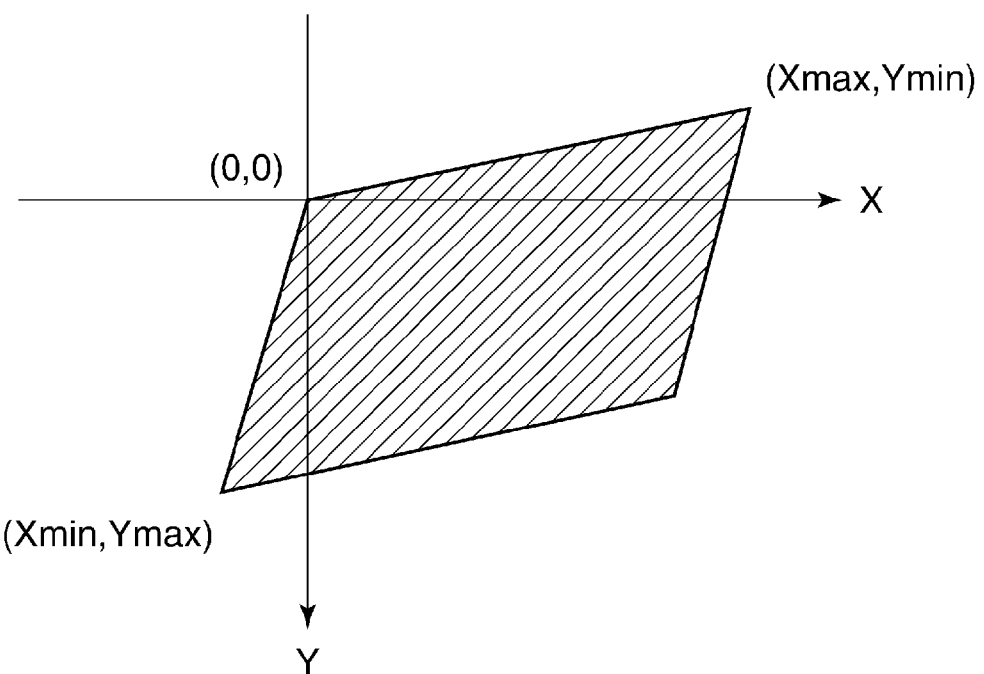
FIG. 2 is a conceptual diagram of a reference area used for correction of rolling-caused distortion.

FIG. 2 is a conceptual diagram of a reference range used in correction of rolling-caused distortion.

In FIG. 2, the reference area is applied to an x-y coordinate system by assuming an imaginary storage plane corresponding to an area (storage area) in the memory 4, and setting a horizontal direction of the imaginary storage plane as an x-axis, a vertical direction of the same as a y-axis, and coordinates of a pixel position before correction, which correspond to an upper left point of an image after correction, to (0, 0).

In this case, a minimum value of the x-coordinate is represented by Xmin, a maximum value of the same is represented by Xmax, a minimum value of the y-coordinate is represented by Ymin, a maximum value of the same is represented by Ymax, and these values are output as the reference range information.

Note that although the coordinates of the upper left point is set to (0, 0) in the present embodiment, the coordinates used as a reference may be set to anywhere insofar as they match reference coordinates of the clipping coordinates, described hereinafter.

Figure 3:
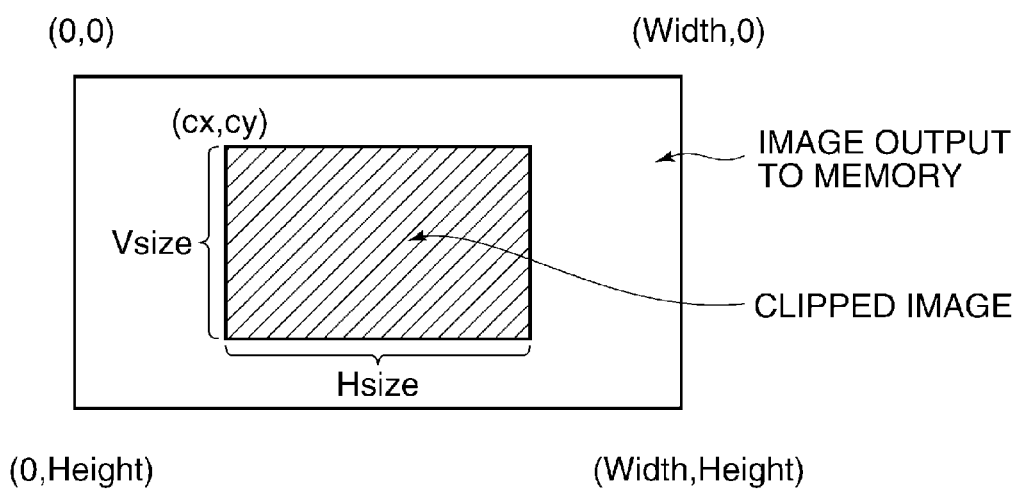
FIG. 3 is a conceptual diagram useful in explaining clipping of image data from a memory.

FIG. 3 is a conceptual diagram useful in explaining clipping of image data from a memory.

In FIG. 3, an "image output to the memory" corresponds to the first image data, and a "clipped image" corresponds to the second image data. As shown in FIG. 3, in the present embodiment, data having a smaller data size than the first image data size is clipped from the storage area. With respect to the image data output on the memory 4, a horizontal direction is set as an x-axis, a vertical direction is set as a y-axis, a horizontal image size is represented by Width, and a vertical image size is represented by Height. The coordinates of an upper left point of the memory 4 are set to (0, 0), the coordinates of an upper left point of the clipped image are set to (cx, cy), the horizontal size of the same is represented by Hsize, and the vertical size of the same is represented by Vsize.

Further, although not shown in FIG. 3, the clipping coordinates of the immediately preceding frame are set to (cx', cy'), and horizontal and vertical components of the amount of movement of the image pickup apparatus 100 output as a signal from the camera shake-detecting section 5 are set to (mx, my). Note that the clipping coordinates (cx', cy') of the immediately preceding frame are obtained by reading out the stored clipping coordinates output from the clipping position-calculating section 7.

Figure 4:
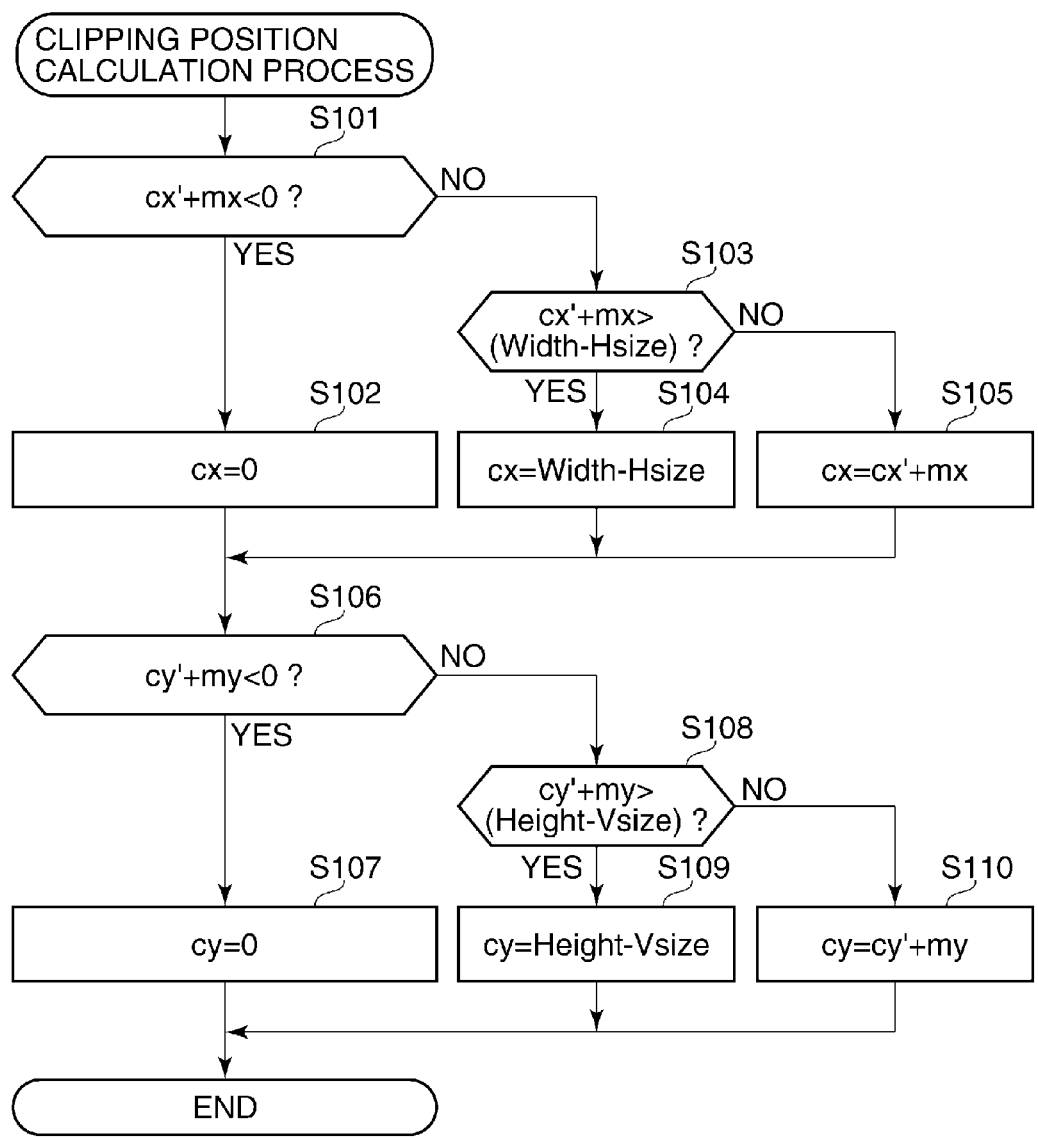
FIG. 4 is a flowchart of a clipping position calculation process executed by a clipping position-calculating section appearing in FIG. 1.

FIG. 4 is a flowchart of a clipping position calculation process executed by the clipping position-calculating section 7 appearing in FIG. 1.

To calculate the horizontal clipping coordinate cx, it is determined whether or not a value obtained by cx'+mx is within the aforementioned area in the memory 4. First, it is determined whether or not cx'+mx<0 holds (step S101). If there is insufficient space on a left side of an image to be clipped, i.e. if cx'+mx<0 holds (YES to the step S101), cx is corrected to 0 (step S102), and then the clipping position-calculating section 7 proceeds to a step S106.

If cx'+mx≥0 holds (NO to the step S101), it is determined whether or not there is insufficient space on a right side of the image to be clipped, i.e. whether or not cx'+mx>(Width−Hsize) holds (step S103). If cx'+mx>(Width−Hsize) holds (YES to the step S103), cx is corrected to a value (Width−Hsize) indicative of a location where the horizontal size of the clipped image can be ensured (step S104), and then the clipping position-calculating section 7 proceeds to the step S106. If cx'+mx≤(Width−Hsize) holds (NO to the step S103), the value of cx'+mx is set to cx (step S105), and then the process proceeds to the step S106.

Next, to calculate the vertical clipping coordinate cy, it is determined whether or not a value obtained by cy'+my is within the aforementioned area in the memory 4. First, it is determined whether or not cy'+my<0 holds (step S106). If there is insufficient space on an upper side of the image to be clipped, i.e. if cy'+my<0 holds (YES to the step S106), cy is corrected to 0 (step S107), followed by terminating the present process.

If cy'+my≥0 holds (NO to the step S106), it is determined whether or not there is insufficient space on a lower side of the image to be clipped, i.e. whether or not cy'+my>(Height−Vsize) holds (step S108). If cy'+my>(Height−Vsize) holds (YES to the step S108), cy is corrected to a value (Height−Vsize) indicative of a location where the vertical size of the clipped image can be ensured (step S109), followed by terminating the present process. If cy'+my≤(Height−Vsize) holds (NO to the step S108), the value of cy'+my is set to cy (step S110), followed by terminating the present process.

Figure 5:
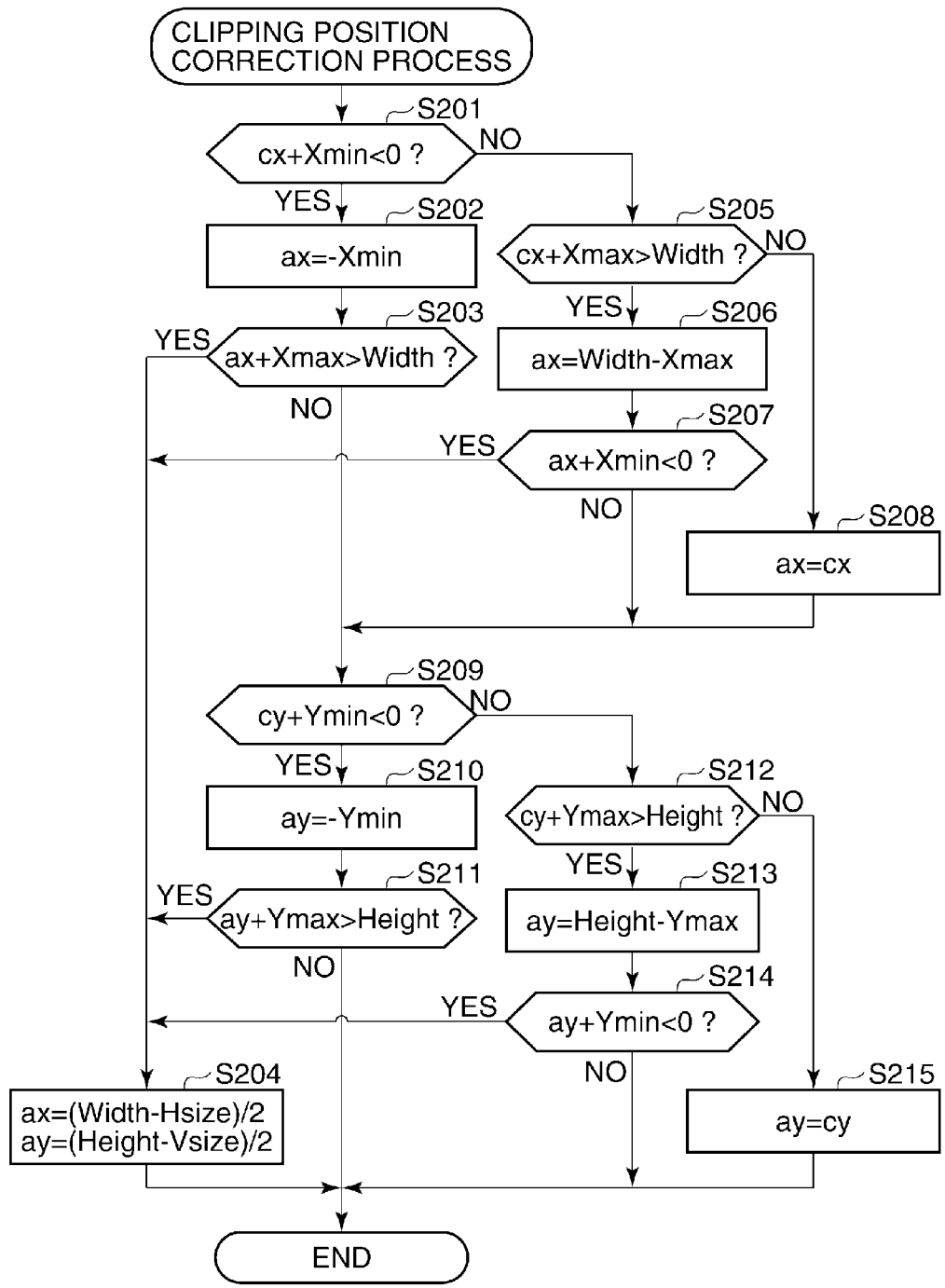
FIG. 5 is a flowchart of a clipping position correction process executed by a clipping position-correcting section appearing in FIG. 1.

FIG. 5 is a flowchart of a clipping position correction process executed by the clipping position-correcting section 8 appearing in FIG. 1.

In FIG. 5, the corrected clipping coordinates are set to (ax, ay). First, the coordinate ax in the horizontal direction after correction is calculated.

First, it is determined whether or not cx+Xmin<0 holds (step S201). As a result of determination in the step S201, if cx+Xmin<0 holds (YES to the step S201), ax is set to −Xmin (step S202).

To determine whether or not the right end of the image to be clipped is located outside the area in the memory 4 when the above-mentioned correction has been performed, it is determined whether or not ax+Xmax>Width holds (step S203). As a result of determination of the step S203, if ax+Xmax>Width holds (YES to the step S203), this indicates that it is impossible to secure an area necessary for rolling-caused distortion correction in the memory 4. Then, to bring back the clipping coordinates to the center of the memory 4, ax is set to (Width−Hsize)/2, and ay is set to (Height−Vsize)/2 (step S204), followed by terminating the present process.

As a result of determination of the step S201, if cx+Xmin≥0 holds (NO to the step S201), it is determined whether or not cx+Xmax>Width holds (step S205). If cx+Xmax>Width holds (YES to the step S205), ax is set to a value obtained by Width−Xmax (step S206).

To determine whether or not the left end of the image to be clipped is located outside the area in the memory 4 when the above-mentioned correction has been performed, it is determined whether or not ax+Xmin<0 holds (step S207). As a result of determination of the step S207, if ax+Xmin<0 holds (YES to the step S207), this indicates that it is impossible to secure an area necessary for rolling-caused distortion correction in the memory 4. Then, to bring back the clipping coordinates to the center of the memory 4, the clipping position-correcting section 8 proceeds to the step S204.

As a result of determination of the step S205, if cx+Xmax≤Width holds (NO to the step S205), this indicates that it is possible to secure an area necessary for rolling-caused distortion correction in the memory 4 without correcting the clipping coordinate in the horizontal direction. Then, ax is set to cx (step S208), and then the clipping position-correcting section 8 proceeds to a step S209.

This is the end of the correction process with respect to the horizontal direction. Next, the clipping coordinate ay in the vertical direction after correction is calculated.

First, it is determined whether or not cy+Ymin<0 holds (step S209). As a result of determination in the step S209, if cy+Ymin<0 holds (YES to the step S209), ay is set to −Ymin (step S210).

To determine whether or not the upper end of the image to be clipped is located outside the area in the memory 4 when the above-mentioned correction has been performed, it is determined whether or not ay+Ymax>Height holds (step S211). As a result of determination of the step S211, if ay+Ymax>Height holds (YES to the step S211), this indicates that it is impossible to secure an area necessary for rolling-caused distortion correction in the memory 4. Then, to bring back the clipping coordinates to the center of the memory 4, the clipping position-correcting section 8 proceeds to the step S204.

As a result of determination of the step S209, if cy+Ymin≥0 holds (NO to the step S209), it is determined whether or not cy+Ymax>Height holds (step S212). As a result of determination of the step S212, if cy+Ymax>Height holds (YES to the step S212), ay is set to a value obtained by Height−Ymax (step S213).

To determine whether or not the lower end of the image to be clipped is located outside the area in the memory 4 when the above-mentioned correction has been performed, it is determined whether or not ay+Ymin<0 holds (step S214). As a result of determination of the step S214, if ay+Ymin>0 holds (YES to the step S214), this indicates that it is impossible to secure an area necessary for rolling-caused distortion correction in the memory 4, and hence. Then, the clipping position-correcting section 8 proceeds to the step S204 so as to bring back the clipping coordinates to the center of the memory 4.

As a result of determination of the step S212, if cy+Ymax≤Height holds (NO to the step S212), this indicates that it is possible to secure an area necessary for rolling-caused distortion correction in the memory 4 without correcting the clipping coordinate in the vertical direction. Therefore, ay is set to cy (step S215), followed by terminating the present process.

The coordinates ax and ay obtained by the clipping position correction process are output as the clipping coordinates.

Although in the present first embodiment, when the coordinates of the image to be clipped is outside the range within which the above-described correction is possible, the clipping position is brought back to the center of the memory 4, the processing may be configured such that the clipping position is not changed in that case.

As described above, in execution of the clipping position control for electronic anti-shake (image stabilization), even when there is not a sufficient image area required for rolling-caused distortion correction, it is possible to perform the rolling-caused distortion correction by correcting the clipping position determined for the electronic anti-shake to a position from which the rolling-caused distortion correction can be successfully executed.

Figure 6:
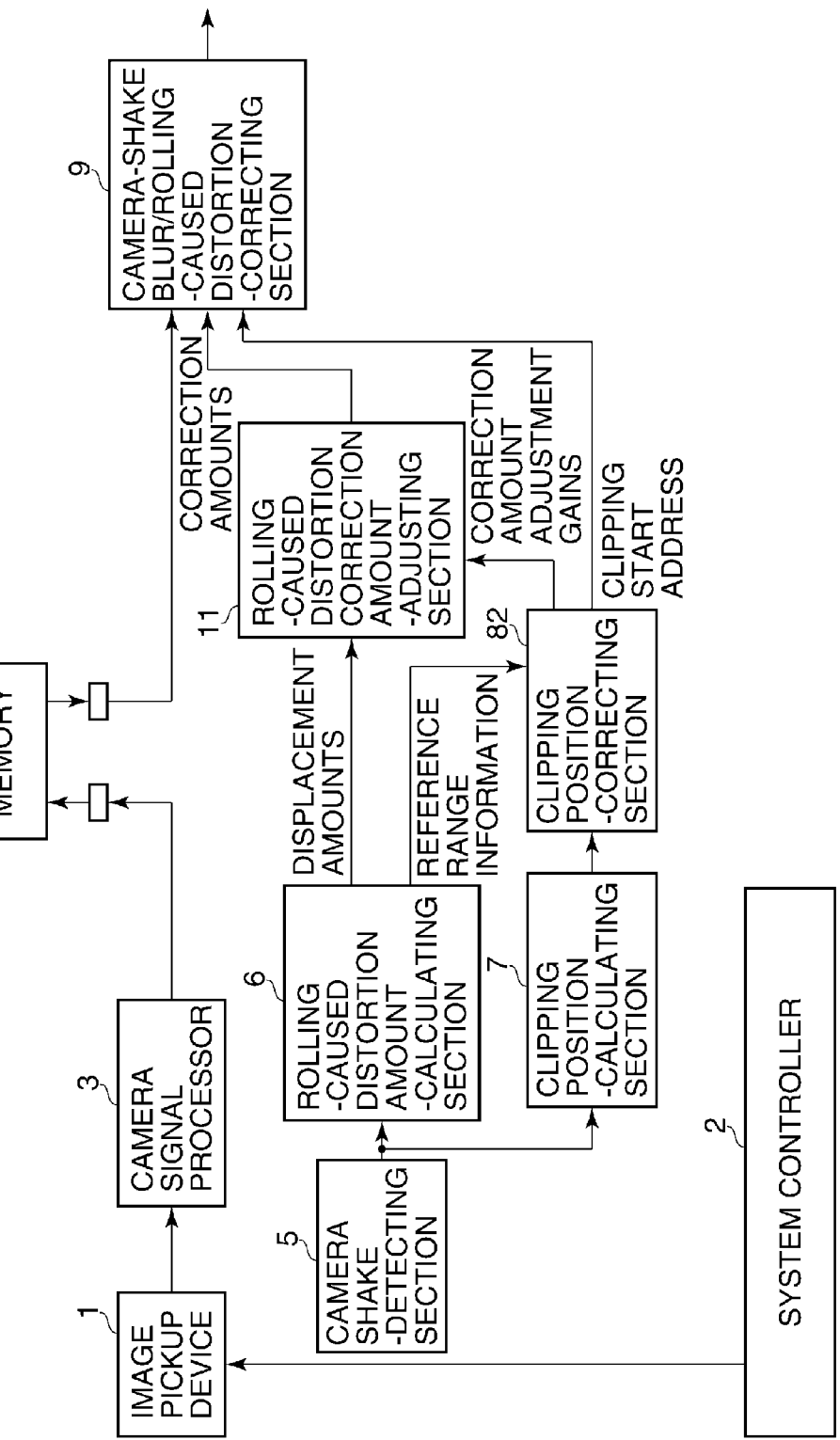
FIG. 6 is a schematic block diagram of an image pickup apparatus according to a second embodiment of the present invention.

FIG. 6 is a schematic block diagram of an image pickup apparatus 200 according to a second embodiment of the present invention.

As shown in FIG. 6, the image pickup apparatus 200 is distinguished from the image pickup apparatus 100 according to the first embodiment in that the clipping position-correcting section 8 is replaced by a clipping position-correcting section 82 having a different function from that of the clipping position-correcting section 8, and a rolling-caused distortion correction amount-adjusting section 11 is newly added. Description of components which are denoted by the same reference numerals as those of the first embodiment and each perform the same processing as in the first embodiment is omitted.

The reference range information output from the rolling-caused distortion amount-calculating section 6 and the clipping coordinates output from the clipping position-calculating section 7 are input to the clipping position-correcting section 82. Then, when the clipping coordinates which enable rolling-caused distortion correction and shift amounts of the coordinates as a result of correction of the clipping coordinates exceed respective predetermined amounts, the clipping position-correcting section 82 calculates a correction amount adjustment gain for reducing a degree of the rolling-caused distortion correction. Thereafter, the clipping position-correcting section 82 outputs the corrected clipping coordinates and the correction amount adjustment gain.

Figure 7:
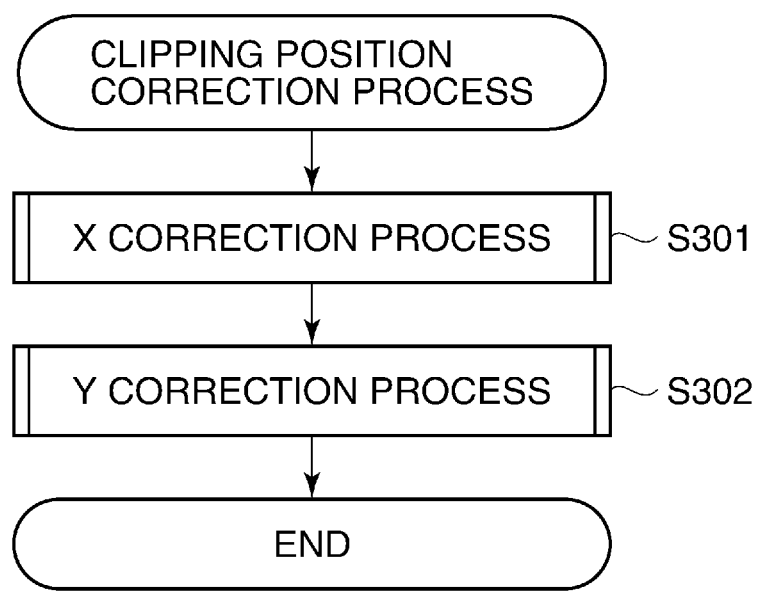
FIG. 7 is a flowchart of a clipping position correction process executed by a clipping position-correcting section appearing in FIG. 6.

FIG. 7 is a flowchart of a clipping position correction process executed by the clipping position-correcting section 82 appearing in FIG. 6.

In FIG. 7, an X correction process for performing correction with respect to the X-coordinate is executed (step S301), and then a Y correction process for performing correction with respect to the Y-coordinate is executed (step S302), followed by terminating the present process.

Figure 8:
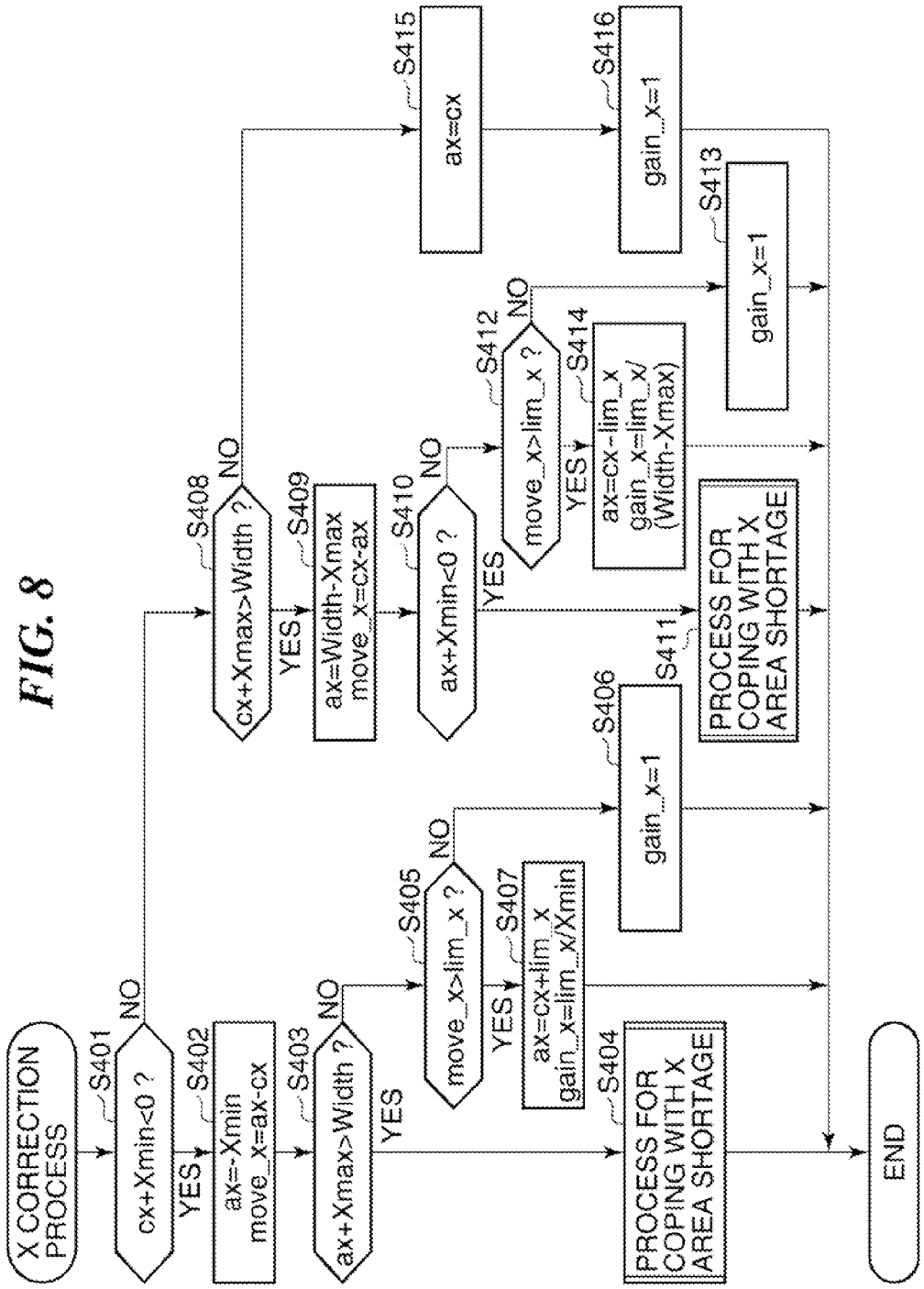
FIG. 8 is a flowchart of an X correction process executed in a step in FIG. 7.

FIG. 8 is a flowchart of the X correction process executed in the step S301 in FIG. 7.

In FIG. 8, the X-coordinate of the corrected clipping position is represented by ax, a shift amount of the X coordinate which enables rolling-caused distortion correction is represented by move_x, an upper limit of the shift amount is represented by lim_x, and the correction amount adjustment gain for rolling-caused distortion correction is represented by gain_x.

First, it is determined whether or not cx+Xmin<0 holds (step S401). As a result of determination of the step S401, if cx+Xmin<0 holds (YES to the step S401), ax is set to −Xmin, and the shift amount move_x is set to a value obtained by ax−cx (step S402).

To determine whether or not the right end of the image to be clipped is located outside the area in the memory 4 when the above-mentioned correction has been performed, it is determined whether or not ax+Xmax>Width holds (step S403). As a result of determination of the step S403, if ax+Xmax>Width holds (YES to the step S403), this indicates that it is impossible to secure an area necessary for rolling-caused distortion correction in the memory 4, and hence a process for coping with X area shortage, described hereinafter, is executed (step S404), followed by terminating the present process.

As a result of determination of the step S403, if ax+Xmax≤Width holds (NO to the step S403), it is determined whether or not move_x>lim_x holds (step S405). As a result of determination of the step S405, if move_x≤lim_x holds (NO to the step S405), this indicates that the shift amount does not exceed the upper limit, and hence gain_x is set to 1 (step S406), followed by terminating the present process.

As a result of determination of the step S405, if move_x>lim_x holds (YES to the step S405), this indicates that the shift amount exceeds the upper limit. Therefore, to set the shift amount to the upper limit, ax is set to cx+lim_x, and gain_x is set to lim_x/Xmin (step S407), followed by terminating the present process.

As a result of determination of the step S401, if cx+Xmin≥0 holds (NO to the step S401), it is determined whether or not cx+Xmax>Width holds (step S408). As a result of determination of the step S408, if cx+Xmax>Width holds (YES to the step S408), ax is set to a value obtained by Width−Xmax, and move_x is set to a value obtained by cx−ax (step S409).

To determine whether or not the left end of the image to be clipped is located outside the area in the memory 4 when the above-mentioned correction has been performed, it is determined whether or not ax+Xmin<0 holds (step S410). As a result of determination of the step S410, if ax+Xmin<0 holds (YES to the step S410), this indicates that it is impossible to secure an area necessary for rolling-caused distortion correction in the memory 4, and hence the process for coping with X area shortage, described hereinafter, is executed (step S411), followed by terminating the present process.

As a result of determination of the step S410, if ax+Xmin≥0 holds (NO to the step S410), it is determined whether or not move_x>lim_x holds (step S412). As a result of determination of the step S412, if move_x≤lim_x holds (NO to the step S412), this indicates that the shift amount does not exceed the upper limit, and hence gain_x is set to 1 (step S413), followed by terminating the present process.

As a result of determination of the step S412, if move_x>lim_x holds (YES to the step S412), this indicates that the shift amount exceeds the upper limit. Then, to set the shift amount to the upper limit, ax is set to a value obtained by cx−lim_x, and gain_x is set to a value obtained by lim_x/(Width−Xmax) (step S414), followed by terminating the present process.

As a result of determination of the step S408, if cx+Xmax≤Width holds (NO to the step S408), this indicates that it is possible to secure an area necessary for rolling-caused distortion correction in the memory 4 without correcting the clipping coordinate in the horizontal direction, and hence ax is set to cx (step S415), and gain_x is set to 1 (step S416), followed by terminating the present process.

Figure 9:
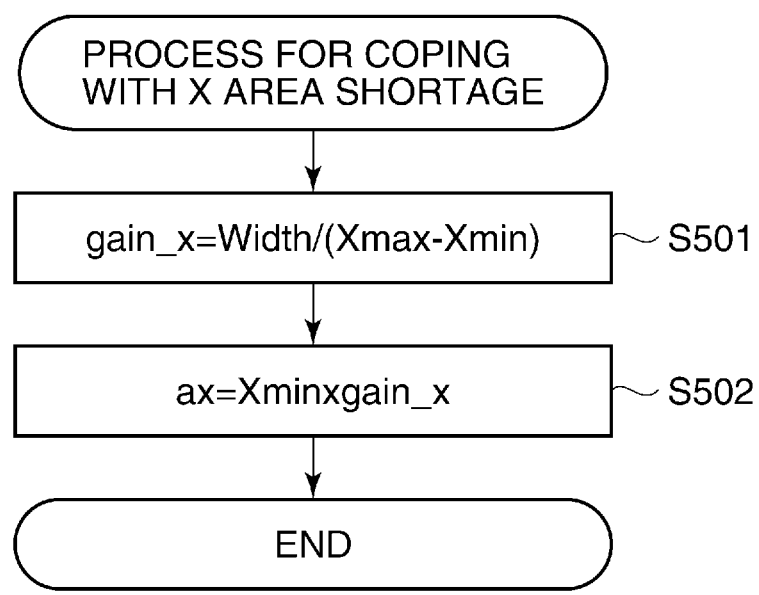
FIG. 9 is a flowchart of a process for coping with X area shortage, which is executed in steps in FIG. 8.

FIG. 9 is a flowchart of the process for coping with X area shortage, which is executed in the steps S404 and S411 in FIG. 8.

In FIG. 9, gain_x is set to a value obtained by Width/(Xmax−Xmin) (step S501), and then ax is set to a value obtained by Xmin*gain_x (step S502), followed by terminating the present process. Thus, the correction amount adjustment gain for the X coordinates, which enables maximum rolling-caused distortion correction in the area in the memory 4, and the clipping X coordinate are calculated.

Figure 10:
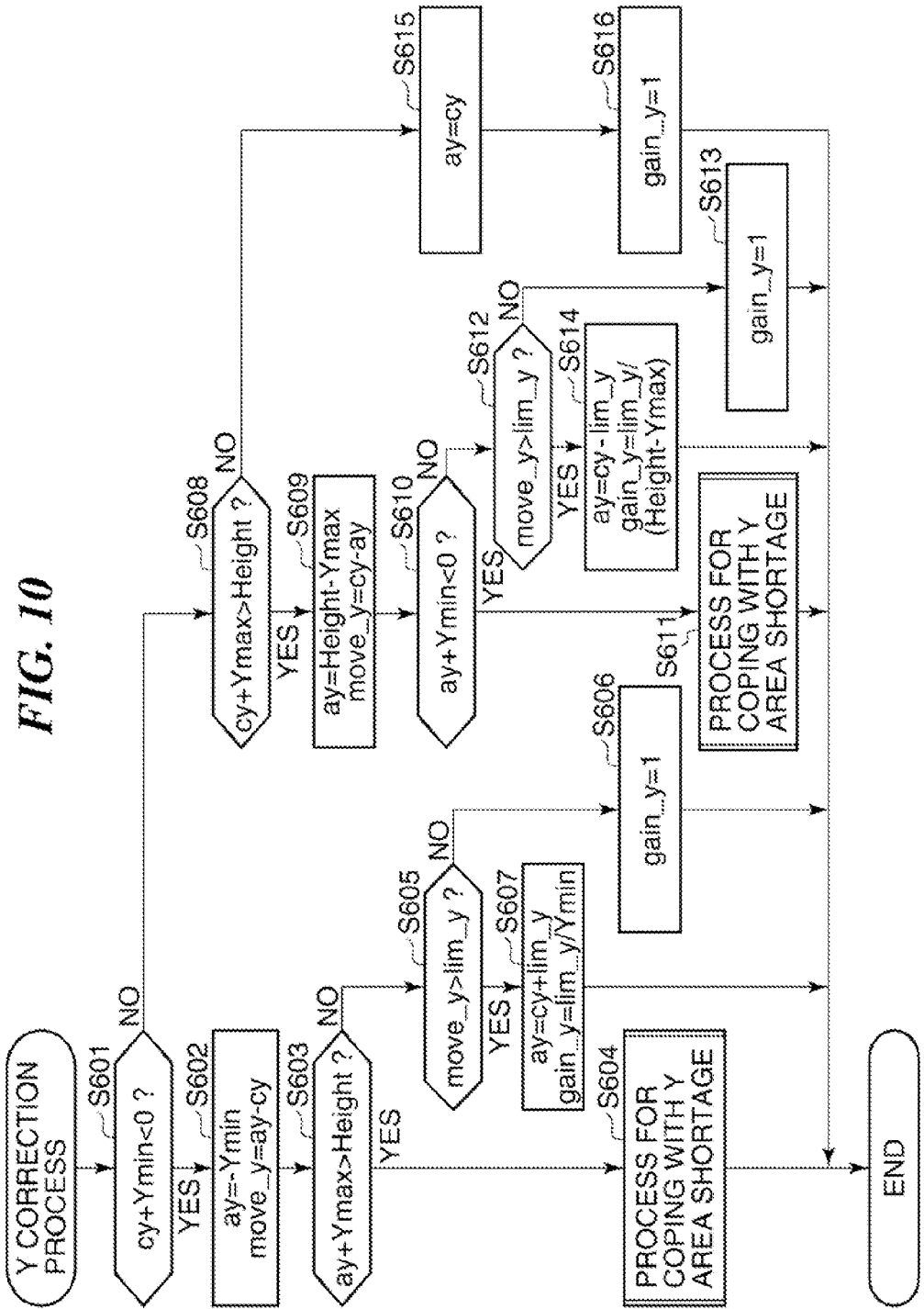
FIG. 10 is a flowchart of a Y correction process executed in a step in FIG. 7.

FIG. 10 is a flowchart of the Y correction process executed in the step S302 in FIG. 7.

In FIG. 10, the Y-coordinate of the corrected clipping position is represented by ay, a shift amount of the Y coordinate which enables rolling-caused distortion correction is represented by move_y, an upper limit of the shift amount is represented by lim_y, and the correction amount adjustment gain for rolling-caused distortion correction is represented by gain_y.

First, it is determined whether or not cy+Ymin<0 holds (step S601). As a result of determination of the step S601, if cy+Ymin<0 holds (YES to the step S601), ay is set to −Ymin, and the shift amount move_y is set to a value obtained by ay−cy (step S602).

To determine whether or not the lower end of the image to be clipped is located outside the area in the memory 4 when the above-mentioned correction has been performed, it is determined whether or not ay+Ymax>Height holds (step S603). As a result of determination of the step S603, if ay+Ymax>Height holds (YES to the step S603), this indicates that it is impossible to secure an area necessary for rolling-caused distortion correction in the memory 4, and hence a process for coping with Y area shortage, described hereinafter, is executed (step S604), followed by terminating the present process.

As a result of determination of the step S603, if ay+Ymax≤Height holds (NO to the step S603), it is determined whether or not move_y>lim_y holds (step S605). As a result of determination of the step S605, if move_y≤lim_y holds (NO to the step S605), this indicates that the shift amount does not exceed the upper limit, and hence gain_y is set to 1 (step S606), followed by terminating the present process.

As a result of determination of the step S605, if move_y>lim_y holds (YES to the step S605), this indicates that the shift amount exceeds the upper limit. Therefore, to set the shift amount to the upper limit, ay is set to a value obtained by cy+lim_y, and gain_y is set to a value obtained by lim_y/Ymin (step S607), followed by terminating the present process.

As a result of determination of the step S601, if cy+Ymin≥0 holds (NO to the step S601), it is determined whether or not cy+Ymax>Height holds (step S608). As a result of determination of the step S608, if cy+Ymax>Height holds (YES to the step S608), ay is set to a value obtained by Height−Ymax, and move_y is set to a value obtained by cy−ay (step S609).

To determine whether or not the upper end of the image to be clipped is located outside the area in the memory 4 when the above-mentioned correction has been performed, it is determined whether or not ay+Ymin<0 holds (step S610). As a result of determination of the step S610, if ay+Ymin<0 holds (YES to the step S610), this indicates that it is impossible to secure an area necessary for rolling-caused distortion correction in the memory 4, and hence the process for coping with Y area shortage, described hereinafter, is executed (step S611), followed by terminating the present process.

As a result of determination of the step S610, if ay+Ymin≥0 holds (NO to the step S610), it is determined whether or not move_y>lim_y holds (step S612). As a result of determination of the step S612, if move_y≤lim_y holds (NO to the step S612), this indicates that the shift amount does not exceed the upper limit, and hence gain_y is set to 1 (step S613), followed by terminating the present process.

As a result of determination of the step S612, if move_y>lim_y holds (YES to the step S612), this indicates that shift amount exceeds the upper limit, and hence, to set the shift amount to the upper limit, ay is set to a value obtained by cy−lim_y, and gain_y is set to a value obtained by lim_y/(Height−Ymax) (step S614), followed by terminating the present process.

As a result of determination of the step S608, if cy+Ymax≤Height holds (NO to the step S608), this indicates that it is possible to secure an area necessary for rolling-caused distortion correction in the memory 4 without correcting the clipping coordinate in the vertical direction. Then, ay is set to cy (step S615), and gain_y is set to 1 (step S616), followed by terminating the present process.

Figure 11:
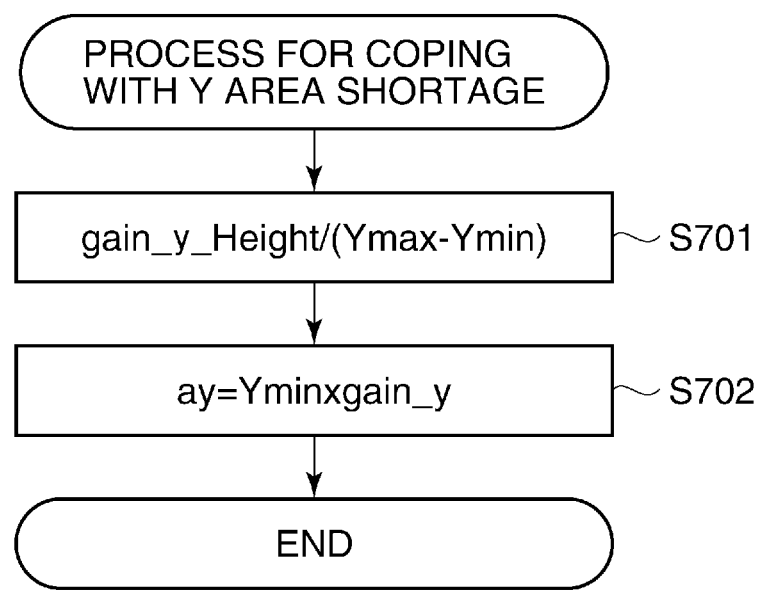
FIG. 11 is a flowchart of a process for coping with Y area shortage executed in steps in FIG. 10.

FIG. 11 is a flowchart of the process for coping with Y area shortage executed in the steps S604 and S611 in FIG. 10.

In FIG. 11, gain_y is set to a value obtained by Height/(Ymax−Ymin) (step S701), and then ay is set to a value obtained by Ymin×gain_y (step S702), followed by terminating the present process. Thus, the correction amount adjustment gain for the Y coordinates, which enables maximum rolling-caused distortion correction in the area in the memory 4, and the clipping Y coordinate are calculated.

As described above, the clipping position correction process is executed by the clipping position-correcting section 82. Thereafter, the rolling-caused distortion correction amount-adjusting section 11 adjusts the shift amounts of the X and Y coordinates based on the displacement amounts output from the rolling-caused distortion amount-calculating section 6 and the correction amount adjustment gains output from the clipping position-correcting section 82, and outputs the adjusted shift amounts.

The adjusted shift amounts are calculated by multiplying the shift amounts in the horizontal and vertical directions by the correction amount adjustment gains, respectively.

In the above-described second embodiment, the rolling-caused distortion correction amount-adjusting section 11 and the camera-shake blur/rolling-caused distortion-correcting section 9 correspond to a correction unit. Therefore, the clipping position-correcting section 82 calculates and outputs the correction amount adjustment gains which are used in calculating correction amounts (shift amounts of the X and Y coordinates) for correcting rolling-caused distortion, by the rolling-caused distortion correction amount-adjusting section 11, according to the range information output from the rolling-caused distortion amount-calculating section 6 and the clipping position calculated by the clipping position-calculating section 7. Then, the camera-shake blur/rolling-caused distortion-correcting section 9 corrects the rolling-caused distortion of the acquired second image data using the correction amounts (shift amounts of the X and Y coordinates) for correcting rolling-caused distortion, which are output from the rolling-caused distortion correction amount-adjusting section 11, and the clipping start address output from the clipping position-correcting section 82.

As described above, in the second embodiment, the upper limit is set to the adjustment amount of the clipping position, and if the adjustment amount exceeds the upper limit, the correction amount used in the rolling-caused distortion correction is reduced, whereby it is possible to perform rolling-caused distortion correction while reducing fluctuations in the angle of view caused by the adjustment of the clipping position.

Figure 12:
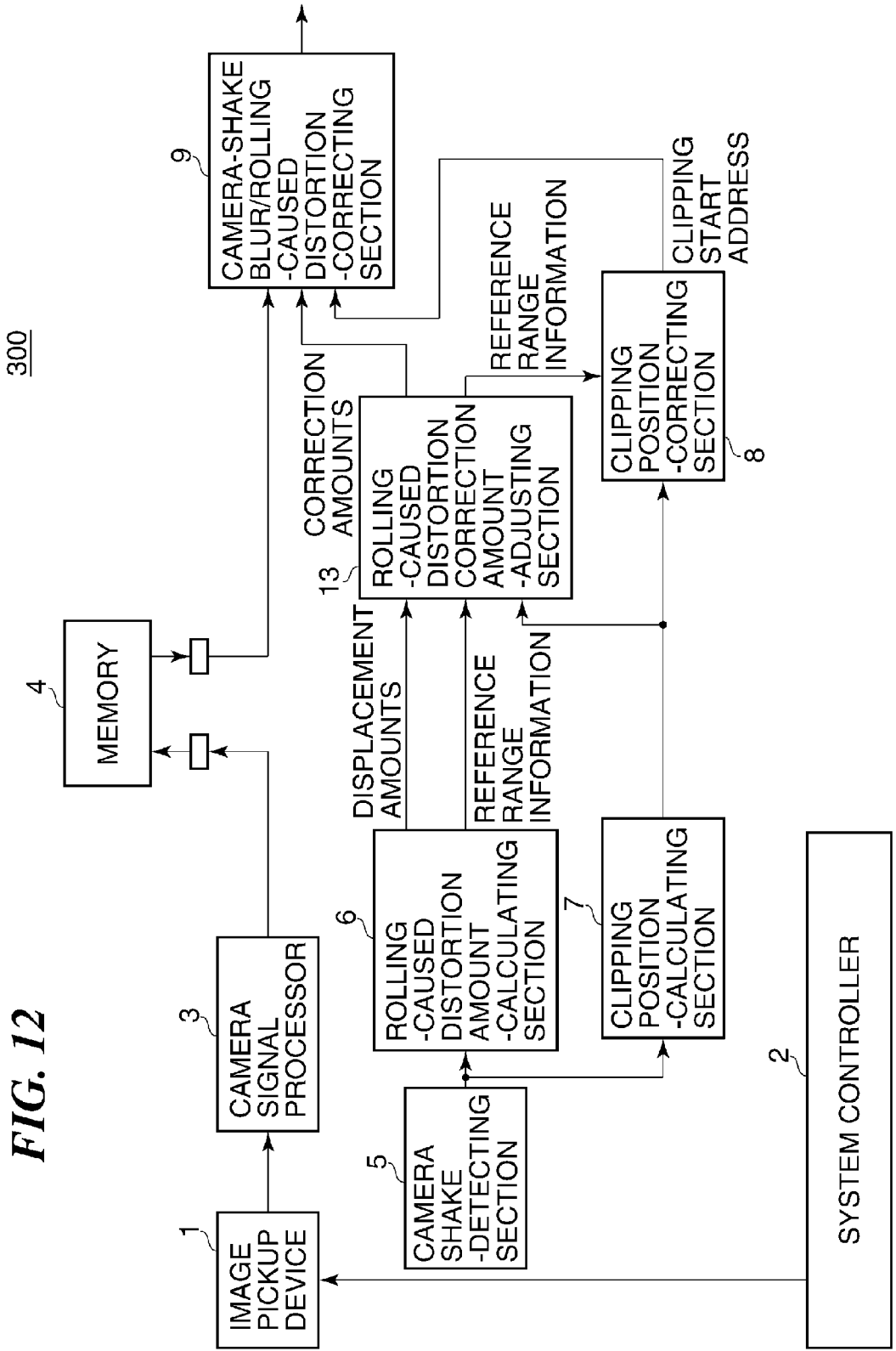
FIG. 12 is a schematic block diagram of an image pickup apparatus according to a third embodiment of the present invention.

FIG. 12 is a schematic block diagram of an image pickup apparatus 300 according to a third embodiment of the present invention.

As shown in FIG. 12, the image pickup apparatus 300 is distinguished from the image pickup apparatus 200 according to the second embodiment in that the rolling-caused distortion correction amount-adjusting section 11 is replaced by a rolling-caused distortion correction amount-adjusting section 13, and the clipping position-correcting section 82 is replaced by the clipping position-correcting section 8. Description of components which are denoted by reference numerals identical to those of the first embodiment and each perform the same processing is omitted.

The rolling-caused distortion correction amount-adjusting section 13 adjusts correction amounts of rolling-caused distortion, using displacement amounts of a formed image location due to rolling-caused distortion and reference range information, which are output from the rolling-caused distortion amount-calculating section 6, and the clipping coordinates of an image which are output from the clipping position-calculating section 7.

Figure 13:
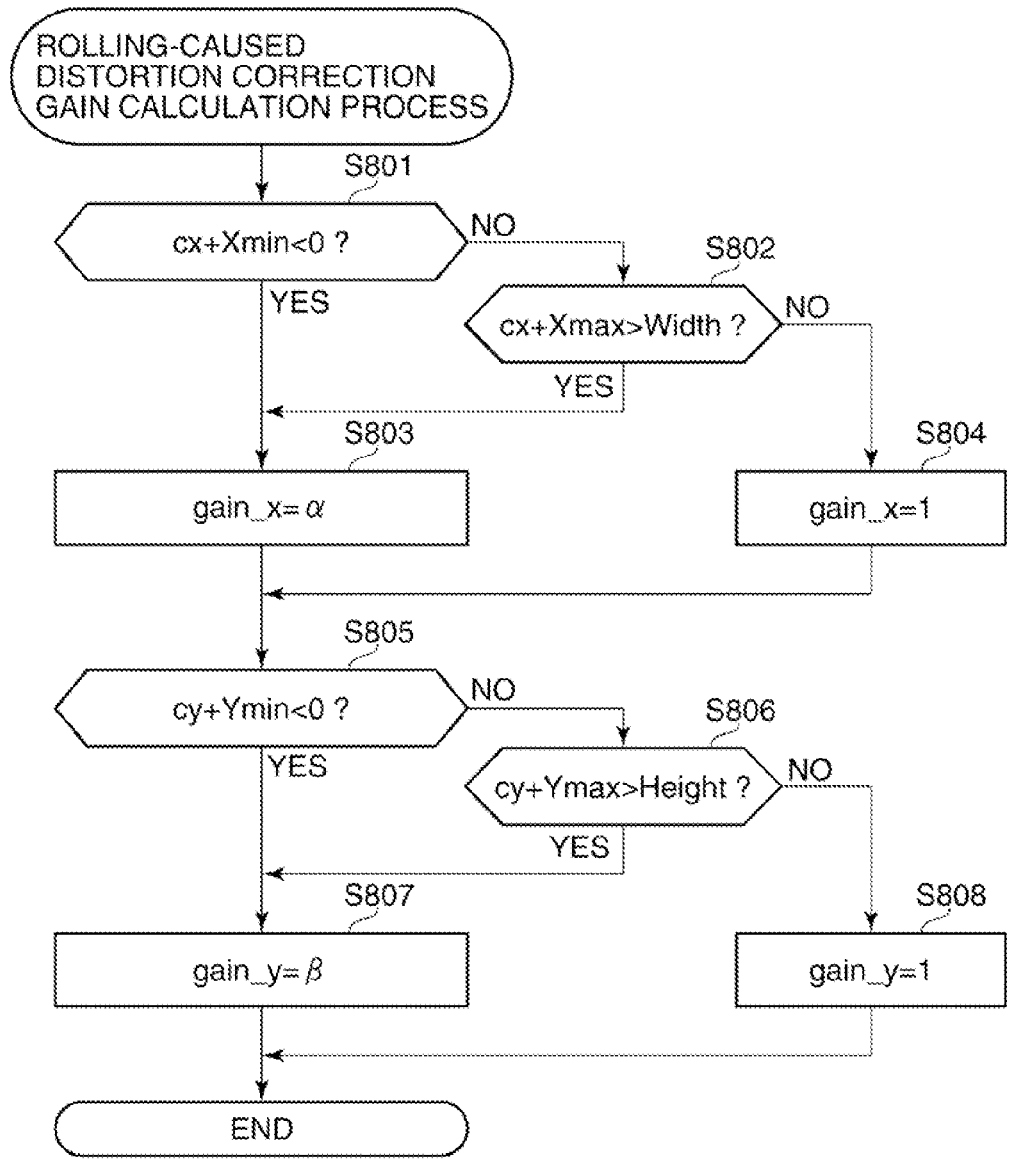
FIG. 13 is a flowchart of a rolling-caused distortion correction gain calculation process executed by a rolling-caused distortion correction amount-adjusting section appearing in FIG. 12.

FIG. 13 is a flowchart of a rolling-caused distortion correction gain calculation process executed by the rolling-caused distortion correction amount-adjusting section 13 appearing in FIG. 12.

In FIG. 13, first, it is determined whether or not cx+Xmin<0 holds (step S801). As a result of determination of the step S801, if cx+Xmin<0 holds (YES to the step S801), this indicates that it is impossible to clip valid image data (second image data) from the memory 4 starting from the current clipping position for rolling-caused distortion correction, and hence, to reduce a degree of the rolling-caused distortion correction, a predetermined value $\alpha$ is set to the correction amount adjustment gain gain_x in the horizontal direction (step S803), and then the rolling-caused distortion correction amount-adjusting section 13 proceeds to a step S805.

As a result of determination of the step S801, if cx+Xmin≥0 holds (NO to the step S801), it is determined whether or not cx+Xmax>Width holds (step S802). As a result of determination of the step S802, if cx+Xmax>Width holds (YES to the step S802), this indicates that it is impossible to clip the valid image data from the memory 4 starting from the current clipping position for rolling-caused distortion correction, and hence, to reduce a degree of the rolling-caused distortion correction, the rolling-caused distortion correction amount-adjusting section 13 proceeds to the step S803.

As a result of determination of the step S802, if cx+Xmax≤Width holds (NO to the step S802), it is not necessary to correct the clipping position from the memory 4, and hence gain_x is set to 1 (step S804), and then the rolling-caused distortion correction amount-adjusting section 13 proceeds to the step S805.

Then, it is determined whether or not cy+Ymin<0 holds (step S805). As a result of determination of the step S805, if cy+Ymin<0 holds (YES to the step S805), this indicates that it is impossible to clip the valid image data from the memory 4 starting from the current clipping position for rolling-caused distortion correction, and hence, to reduce a degree of the rolling-caused distortion correction, a predetermined value $\beta$ is set to the correction amount adjustment gain gain_y in the vertical direction (step S807), followed by terminating the present process.

As a result of determination of the step S805, if cy+Ymin≥0 holds (NO to the step S805), it is determined whether or not cy+Ymax>Height holds (step S806). As a result of determination of the step S806, if cy+Ymax>Height holds (YES to the step S806), this indicates that it is impossible to clip the valid image data from the memory 4 starting from the current clipping position for rolling-caused distortion correction, and hence, to reduce a degree of the rolling-caused distortion correction, the rolling-caused distortion correction amount-adjusting section 13 proceeds to the step S807.

As a result of determination of the step S806, if cy+Ymax≤Height holds (NO to the step S806), it is not necessary to correct the clipping position from the memory 4, and hence gain_y is set to 1 (step S808), followed by terminating the present process.

The rolling-caused distortion correction amount-adjusting section 13 outputs corrected shift amounts of X and Y coordinates by multiplying the shift amounts of X and Y coordinates of each pixel by gain_x and gain_y thus calculated, respectively.

Further, the rolling-caused distortion correction amount-adjusting section 13 outputs the minimum value Xmin' and the maximum value Xmax' of the x-coordinate, and the minimum value Ymin' and the maximum value Ymax' of the y-coordinate as the reference range information based on the corrected shift amounts.

In the above-described third embodiment, the rolling-caused distortion correction amount-adjusting section 13 corresponds to another output unit. Therefore, the rolling-caused distortion correction amount-adjusting section 13 calculates and outputs, based on the range information and the displacement amounts calculated by the rolling-caused distortion-calculating section 6, correction amounts (shift amounts of X and Y coordinates) for use of correction of rolling-caused distortion by the camera-shake blur/rolling-caused distortion-correcting section 9 and the range information corrected according to the correction amount adjustment gains. The camera-shake blur/rolling-caused distortion-correcting section 9 corrects the rolling-caused distortion using the correction amounts (corrected shift amounts) output from the rolling-caused distortion correction amount-adjusting section 13, and the clipping start address output from the clipping position-correcting section 8.

Further, the clipping position-correcting section 8 corrects the clipping position using the range information output from the rolling-caused distortion correction amount-adjusting section 13 in place of the range information calculated by the rolling-caused distortion amount-calculating section 6, and outputs the corrected clipping position as the clipping start address.

As described above, in the third embodiment, in the clipping position control for electronic anti-shake (image stabilization), even when an image area necessary for rolling-caused distortion correction is insufficient, it is possible to correct rolling-caused distortion by adjusting the correction amounts for rolling-caused distortion correction and the clipping position for electronic anti-shake (image stabilization).

According to the above-described first to third embodiments, it is possible to reduce camera-shake blur and rolling-caused distortion of an image obtained by shooting without including invalid data.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-106213, filed May 11, 2011, which is hereby incorporated by reference herein in its entirety.

What is claimed is:

1. An image pickup apparatus that includes a storage area capable of storing first image data indicative of an object obtained by shooting the object by a rolling shutter method, and clips data having a smaller data size than a size of the first image data from the storage area, to thereby acquire the clipped data as second image data, comprising:
- a detection unit configured to detect an amount of movement due to a camera shake;
- a first calculation unit configured to calculate a clipping position which enables correction of camera-shake blur, within a range of the first image data stored in the storage area from which the second image data can be clipped, according to the amount of movement detected by the detection unit;
- a second calculation unit configured to calculate range information indicative of a range in the storage area for use in correcting rolling-caused distortion caused by shooting by the rolling shutter method, and a displacement amount of the first image data caused by the rolling-caused distortion;
- an output unit configured to directly output the calculated clipping position when it is possible to clip data in the range indicated by the range information calculated by the second calculation unit from the first image data, starting from the clipping position calculated by the first calculation unit, and to output the clipping position corrected such that data in the range indicated by the range information can be clipped from the first image data when it is impossible to clip the data in the range indicated by the range information calculated by the second calculation unit, starting from the clipping position calculated by the first calculation unit; and
- a correction unit configured to acquire the data in the range indicated by the range information starting from the clipping position output from the output unit as the second image data, and correct the rolling-caused distortion of the acquired second image data based on the displacement amount calculated by the second calculation unit.

2. The image pickup apparatus according to claim 1, wherein the output unit further outputs a correction amount adjustment gain for use in correction of the rolling-caused distortion by the correction unit, according to the range information calculated by the second calculation unit and the clipping position calculated by the first calculation unit, and
   wherein the correction unit corrects the rolling-caused distortion of the acquired second image data based on the displacement amount calculated by the second calculation unit and the correction amount adjustment gain.

3. The image pickup apparatus according to claim 1, further comprising another output unit configured to calculate correction amount adjustment gains for use in correction of the rolling-caused distortion by the correction unit, based on the range information and the displacement amount calculated by the second calculation unit, and output corrected range information obtained by correcting the range information based on the correction amount adjustment gain, and
   wherein the output unit outputs the clipping position based on the corrected range information output from the another output unit in place of the range information calculated by the second calculation unit.

4. A method of controlling an image pickup apparatus that includes a storage area capable of storing first image data indicative of an object obtained by shooting the object by a rolling shutter method, and clips data having a smaller data size than a size of the first image data from the storage area, to thereby acquire the clipped data as second image data, comprising:
- detecting an amount of movement due to a camera shake;
- calculating a clipping position which enables correction of camera-shake blur, within a range of the first image data stored in memory from which the second image data can be clipped, according to the detected amount of movement;
- calculating range information indicative of a range in the storage area for use in correcting rolling-caused distortion caused by shooting by the rolling shutter method;
- calculating a displacement amount of the first image data caused by the rolling-caused distortion;
- directly outputting the calculated clipping position when it is possible to clip data in the range indicated by the calculated range information from the first image data, starting from the calculated clipping position, and outputting the clipping position corrected such that data in the range indicated by the range information can be clipped from the first image data when it is impossible to clip the data in the range indicated by the calculated range information, starting from the calculated clipping position; and
- acquiring the data in the range indicated by the range information starting from the output clipping position as the second image data, and correct the rolling-caused distortion of the acquired second image data based on the calculated displacement amount.

5. A non-transitory computer-readable storage medium storing a computer-executable program for causing a computer to execute a method of controlling an image pickup apparatus that includes a storage area capable of storing first image data indicative of an object obtained by shooting the object by a rolling shutter method, and clips data having a smaller data size than a size of the first image data from the storage area, to thereby acquire the clipped data as second image data, wherein the method comprises:
- detecting an amount of movement due to a camera shake;
- calculating a clipping position which enables correction of camera-shake blur, within a range of the first image data stored in memory from which the second image data can be clipped, according to the detected amount of movement;
- calculating range information indicative of a range in the storage area for use in correcting rolling-caused distortion caused by shooting by the rolling shutter method;
- calculating a displacement amount of the first image data caused by the rolling-caused distortion;
- directly outputting the calculated clipping position when it is possible to clip data in the range indicated by the calculated range information from the first image data, starting from the calculated clipping position, and outputting the clipping position corrected such that data in the range indicated by the range information can be clipped from the first image data when it is impossible to clip the data in the range indicated by the calculated range information, starting from the calculated clipping position; and
- acquiring the data in the range indicated by the range information starting from the output clipping position as the second image data, and correct the rolling-caused distortion of the acquired second image data based on the calculated displacement amount.

6. An image pickup apparatus that includes a storage area capable of storing image data indicative of an object obtained by shooting the object by a rolling shutter method, comprising:
- a first calculation unit configured to calculate a clipping position which enables correction of camera-shake blur, within a first range of the image data stored in the storage area, according to an amount of movement due to a camera shake;

a second calculation unit configured to calculate a displacement amount for use in correcting rolling-caused distortion caused by shooting by the rolling shutter method;

an output unit configured to determine whether or not at least a part of a second range obtained based on the calculated clipping position and the calculated displacement amount is located outside the first range of the image data, and to output, with the clipping position corrected based on the calculated displacement amount, the corrected clipping position when the at least the part of the second range is located outside the first range of the image data; and a correction unit configured to correct the camera-shake blur and the rolling-caused distortion of the image data based on the corrected clipping position and the calculated displacement amount.

7. A method of controlling an image pickup apparatus that includes a storage area capable of storing image data indicative of an object obtained by shooting the object by a rolling shutter method, comprising:

calculating a clipping position which enables correction of camera-shake blur, within a first range of the image data stored in the storage area, according to an amount of movement due to a camera shake;

calculating a displacement amount for use in correcting rolling-caused distortion caused by shooting by the rolling shutter method;

determining whether or not at least a part of a second range obtained based on the calculated clipping position and the calculated displacement amount is located outside the first range of the image data;

outputting, with the clipping position corrected based on the calculated displacement amount, the corrected clipping position when the at least the part of the second range is located outside the first range of the image data; and correcting the camera-shake blur and the rolling-caused distortion of the image data based on the corrected clipping position and the calculated displacement amount.

8. A non-transitory computer-readable storage medium storing a computer-executable program for causing a computer to execute a method of controlling an image pickup apparatus that includes a storage area capable of storing first image data indicative of an object obtained by shooting the object by a rolling shutter method, the method comprising:

calculating a clipping position which enables correction of camera-shake blur, within a first range of the image data stored in the storage area, according to an amount of movement due to a camera shake;

calculating a displacement amount for use in correcting rolling-caused distortion caused by shooting by the rolling shutter method;

determining whether or not at least a part of a second range obtained based on the calculated clipping position and the calculated displacement amount is located outside the first range of the image data;

outputting, with the clipping position corrected based on the calculated displacement amount, the corrected clipping position when the at least the part of the second range is located outside the first range of the image data; and correcting the camera-shake blur and the rolling-caused distortion of the image data based on the corrected clipping position and the calculated displacement amount.

* * * * *